United States Patent
Takeda et al.

(10) Patent No.: US 10,530,554 B2
(45) Date of Patent: Jan. 7, 2020

(54) USER TERMINAL, RADIO BASE STATION AND RADIO COMMUNICATION METHOD FOR DEACTIVATION OF SCELL IN A CELL GROUP

(71) Applicant: NTT DOCOMO, INC., Tokyo (JP)

(72) Inventors: Kazuki Takeda, Tokyo (JP); Tooru Uchino, Tokyo (JP); Kunihiko Teshima, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/933,935

(22) Filed: Mar. 23, 2018

(65) Prior Publication Data

US 2018/0212742 A1    Jul. 26, 2018

Related U.S. Application Data

(63) Continuation of application No. PCT/JP2016/078116, filed on Sep. 23, 2016.

(30) Foreign Application Priority Data

Sep. 24, 2015   (JP) ................................ 2015-187471

(51) Int. Cl.
  *H04W 4/00*        (2018.01)
  *H04L 5/00*        (2006.01)
  *H04W 24/10*       (2009.01)
  *H04L 1/18*        (2006.01)
  *H04W 72/04*       (2009.01)
  *H04W 88/02*       (2009.01)
  (Continued)

(52) U.S. Cl.
  CPC .......... *H04L 5/0057* (2013.01); *H04L 1/1812* (2013.01); *H04L 5/0098* (2013.01); *H04W 24/10* (2013.01); *H04W 72/0406* (2013.01); *H04W 76/30* (2018.02); *H04W 88/023* (2013.01); *H04L 1/0026* (2013.01); *H04L 5/0005* (2013.01); *H04L 5/0055* (2013.01); *H04W 88/08* (2013.01)

(58) Field of Classification Search
  None
  See application file for complete search history.

(56) References Cited

U.S. PATENT DOCUMENTS

2016/0262118 A1*  9/2016  Kim .................... H04W 52/365
2016/0278083 A1*  9/2016  Dinan .................. H04B 7/0626
(Continued)

OTHER PUBLICATIONS

International Search Report issued in the corresponding International Application No. PCT/JP2016/078116, dated Dec. 6, 2016 (2 pages).

(Continued)

*Primary Examiner* — Farah Faroul
(74) *Attorney, Agent, or Firm* — Osha Liang LLP

(57) ABSTRACT

A user terminal is disclosed including a transmitter that communicates with a first cell group (CG) including a first secondary cell (Scell) and transmits uplink control information using an uplink control channel of the first Scell. The user terminal includes a processor that deactivates the first Scell within a predetermined period from a subframe in which a deactivation command for the first Scell is reported or a subframe in which a deactivation timer applied to the first Scell expires.

6 Claims, 13 Drawing Sheets

(51) Int. Cl.
  *H04W 76/30*  (2018.01)
  *H04L 1/00*  (2006.01)
  *H04W 88/08*  (2009.01)

(56) References Cited

U.S. PATENT DOCUMENTS

2017/0013611 A1* 1/2017 Dinan .................. H04W 52/146
2018/0049186 A1* 2/2018 Hong ................... H04L 5/0032

OTHER PUBLICATIONS

Written Opinion issued in the corresponding International Application No. PCT/JP2016/078116, dated Dec. 6, 2016 (4 pages).
3GPP TS 36.300 V12.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12); Dec. 2014 (251 pages).
Intel Corporation; "Considerations for PUCCH on SCell in carrier aggregation"; 3GPP TSG RAN WG2 Meeting #89, R2-150169; Athens, Greece, Feb. 9-13, 2015 (4 pages).
Nokia Corporation (Rapporteur); "Running 36.300 CR to capture agreements on carrier aggregation enhancements"; 3GPP TSG-RAN WG2 Meeting #89bis, R2-151739; Bratislava, Slovakia, Apr. 20-24, 2015 (5 pages).
Office Action issued in the counterpart Japanese Patent Application No. 2015-187471, dated Dec. 6, 2016 (9 pages).
Extended European Search Report issued in corresponding European Application No. 16848692.6, dated Aug. 30, 2018 (10 pages).
3GPP TS 36.213 V10.13.0; "3rd Generation Partnership Project; Technical Specification Group Radio Access Network; Evolved Universal Terrestrial Radio Access (E-UTRA); Physical layer procedures (Release 10)"; Jun. 2015 (128 pages).
3GPP TS 36.321 V12.5.0; "3rd Generation Partnership Project; Technical Specification Group Radio Access Network; Evolved Universal Terrestrial Radio Access (E-UTRA); Medium Access Control (MAC) protocol specification (Release 12)"; Mar. 2015 (77 pages).
NTT Docomo, Inc; "Activation/Deactivation of PUCCH SCell"; 3GPP TSG-RAN WG2 #90, R2-152424; Fukuoka, Japan; May 25-29, 2015 (5 pages).

* cited by examiner

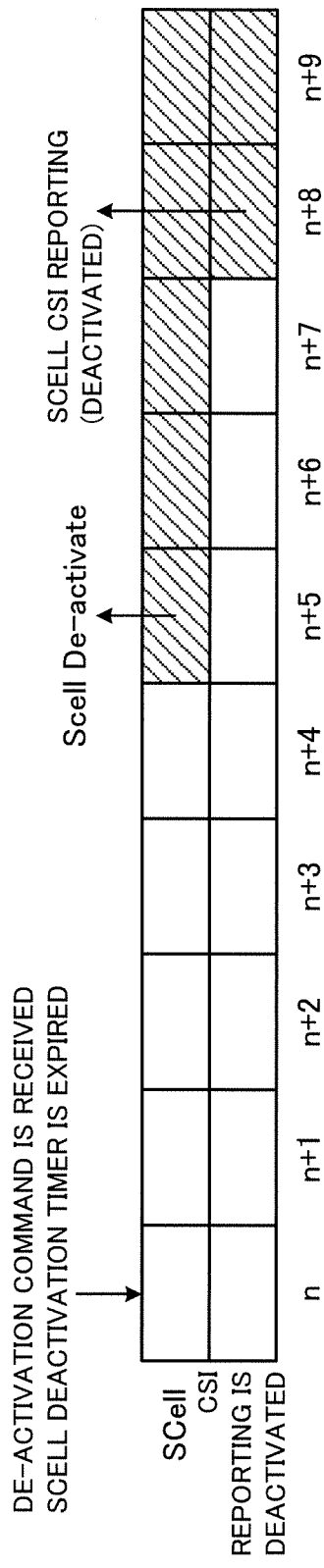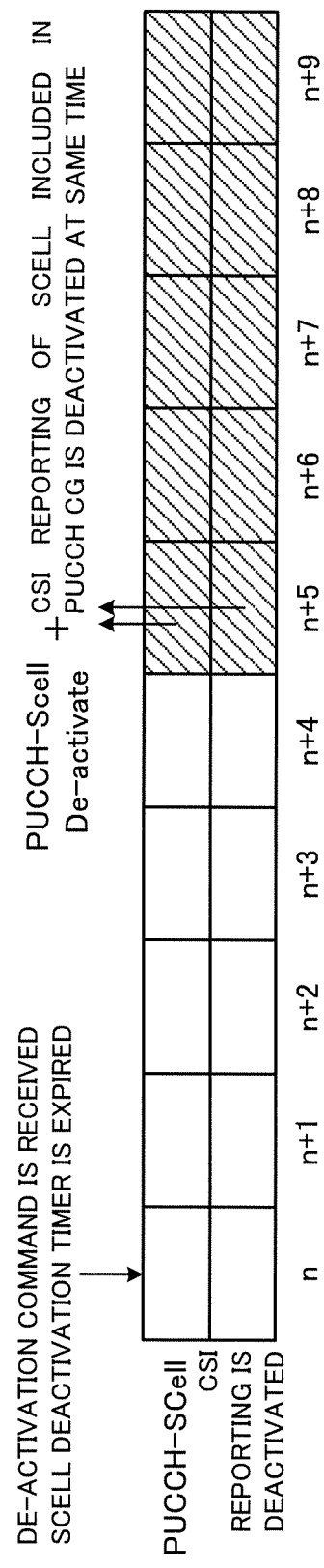

USER TERMINAL, RADIO BASE STATION AND RADIO COMMUNICATION METHOD FOR DEACTIVATION OF SCELL IN A CELL GROUP

CROSS-REFERENCE TO RELATED APPLICATIONS

The present application is a continuation of application of PCT Application No. PCT/JP2016/078116, filed on Sep. 23, 2016, which claims priority to Japanese Patent Application No. 2015-187471, filed on Sep. 24, 2015. The contents of these applications are hereby incorporated by reference in their entirety.

TECHNICAL FIELD

One or more embodiments disclosed herein relate to a user terminal, a radio base station and a radio communication method in next-generation mobile communication systems.

BACKGROUND

In the Universal Mobile Telecommunications System (UMTS) network, the specifications of long term evolution (LTE) have been drafted for the purpose of further increasing high speed data rates, providing lower delays and so on (see non-patent literature 1). Also, the specifications of LTE-A (also referred to as LTE-advanced, LTE Rel. 10, 11 or 12) have been drafted for further broadbandization and increased speed beyond LTE (also referred to as LTE Rel. 8 or 9), and successor systems of LTE (also referred to as, for example, Future Radio Access (FRA), fifth generation mobile communication system (5G), LTE Rel. 13 and so on) are under study.

Also, the specifications of LTE-A (also referred to as "LTE-advanced," "LTE Rel. 10," "LTE Rel. 11" or "LTE Rel. 12") have been drafted for further broadbandization and increased speed beyond LTE (also referred to as LTE Rel. 8 or 9), and successor systems of LTE (also referred to as, for example, "FRA" (Future Radio Access), "5G" (fifth generation mobile communication system), "LTE Rel. 13" and so on) are under study. Carriers that constitute the fundamental units in carrier aggregation (CA) are referred to as "component carriers" (CCs), and are equivalent to the system band of LTE Rel. 8.

When CA is used, in a user terminal (User Equipment (UE)), a primary cell (Primary Cell (Pcell)), which is a cell with high reliability to ensure connectivity, and a secondary cell (Secondary Cell (Scell)) which is an adjunct cell, are configured.

The UE can first connect to the PCell and add the SCell if necessary. PCell is a single cell (standalone cell) that supports Radio Link Monitoring (RLM), Semi-Persistent Scheduling (SPS), and the like. SCell is a cell that is configured in UE in addition to PCell.

SCell is added and deleted by Radio Resource Control (RRC) signaling. SCell is in a deactivated state immediately after being added to the user terminal, and can only perform communication (scheduling) after being activated.

On the other hand, in LTE Rel. 12, dual connectivity (DC) has also been introduced where multiple cell groups (CG) formed by different radio base stations are configured in the user terminal. Each cell group consists of at least one cell (CC). In DC, since multiple CCs of different radio base stations are integrated, DC is also called inter-eNB CA.

Also, the specifications of LTE Rel. 8 to 12 have been drafted assuming exclusive operations in frequency bands that are licensed to operators (licensed bands). As licensed bands, for example, the 800 MHz, 2 GHz and/or 1.7 GHz bands are used. Meanwhile, in LTE of Rel. 13 and later versions, operation in frequency bands where license is not required (unlicensed bands) is also a target of study. For unlicensed bands, for example, the 2.4 GHz and/or the 5 GHz band are used as in Wi-Fi (registered trademark).

Although carrier aggregation (license-assisted access (LAA)) between licensed bands and unlicensed bands is placed under study in Rel. 13 LTE, there is a possibility that, in the future, dual connectivity (DC) and unlicensed-band stand-alone will becomes targets of study as well.

In LTE Rel. 8 to 12, Hybrid Automatic Repeat reQuest (HARQ) is used for retransmission control. In HARQ, the user terminal (or the radio base station) feeds back the delivery acknowledgment signal (also referred to as HARQ-ACK, ACK/NACK, A/N, etc.) for the data in accordance with the data reception result at a predetermined timing. The radio base station (or user terminal) controls data retransmission based on the feedback HARQ-ACK.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY

In accordance with embodiments of the present invention, a user terminal includes a transmitter that communicates with a first cell group (CG) including a first secondary cell (Scell) and transmits uplink control information using an uplink control channel of the first Scell, and a processor that deactivates the first Scell within a predetermined period from a subframe in which a deactivation command for the first Scell is reported or a subframe in which a deactivation timer applied to the first Scell expires.

In some aspects, the first CG includes a second Scell, and the processor does not cause the transmitter to perform channel state information (CSI) reporting in the second Scell at the same time as or before when the first Scell is deactivated.

In some aspects, the first CG includes a second Scell, and when the deactivation command for the first Scell is reported, the processor deactivates the second Scell.

In some aspects, when the deactivation command reported to a certain Scell or the deactivation timer applied to the certain Scell expires, if a cell that transmits an uplink control channel in a CG including the Scell is in an active state in a subframe a predetermined period later, the processor causes the transmitter to perform CSI reporting of the Scell.

In some aspects, the transmitter communicates with a second CG including a primary cell (Pcell) and a third Scell, the transmitter transmits an uplink control channel using the Pcell, and when the deactivation command for the third Scell is reported or the deactivation timer applied to the third Scell expires, the processor causes the transmitter to perform CSI reporting of the third Scell in a predetermined subframe regardless of the timing of the third Scell being deactivated.

In accordance with embodiments of the present invention, a radio base station includes a receiver that communicates with a user terminal connected with a cell group (CG) including a first secondary cell (Scell), and receives uplink control information transmitted from the user terminal in an uplink control channel of the first Scell, and a transmitter that transmits a deactivation command for the first Scell. The first Scell is deactivated in the user terminal within a predetermined period from a subframe in which the deactivation command for the first Scell is transmitted.

In accordance with embodiments of the present invention, a radio communication method for a user terminal includes transmitting uplink control information using an uplink control channel of a first secondary cell (Scell) in a cell group (CG), and deactivating the first Scell within a predetermined period from a subframe in which a deactivation command for the first Scell is reported or a subframe in which a deactivation timer applied to the first Scell expires.

BRIEF DESCRIPTION OF DRAWINGS

FIG. 5A and FIG. 5B are diagrams to show an example of deactivation in the First Example in accordance with embodiments of the invention;

DETAILED DESCRIPTION

Figure 1:
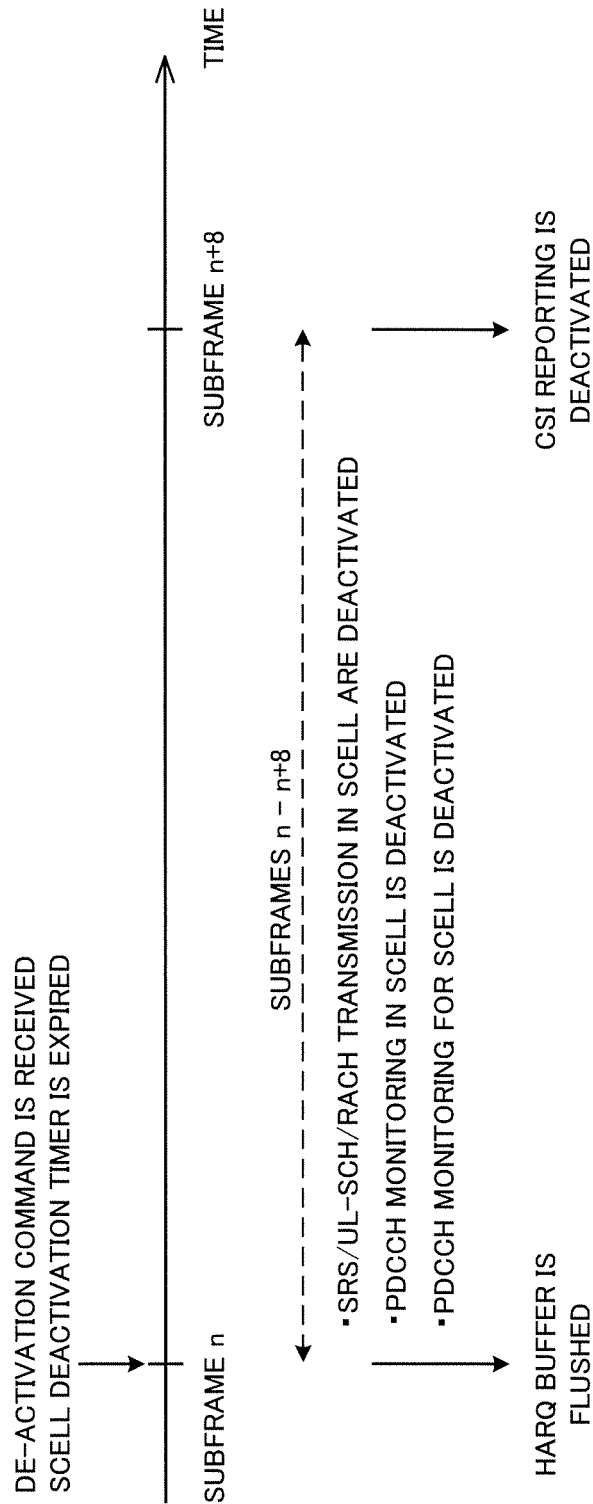
FIG. 1 is a diagram to show an example of deactivation of SCell in an existing system.

In CA in existing LTE systems (Rel. 10 to 12), the number of CCs that can be configured per user terminal is limited to a maximum of five. On the other hand, CA in and after LTE Rel. 13 is required to realize more flexible and high-speed wireless communication, and CA enhancement is under study, in which the number of CCs that can be configured per UE in CA is expanded. In CA enhancement, a study is in progress to alleviate the limit on the number of CCs that can be configured per UE and configure more than 6 CCs (more than 5 CCs). Increasing the maximum number of CCs will dramatically improve the achievable peak rates.

When the number of CCs that can be configured in a user terminal is expanded to six or more (for example, 32), it becomes difficult to use the transmission methods of existing systems (Rel. 10 to 12) on an as-is basis.

For example, in existing LTE systems, a user terminal adopting CA also transmits uplink control information of another SCell using an uplink control channel (for example, Physical Uplink Control CHannel (PUCCH)) of a specific cell (for example, PCell). On the other hand, in the case of CA enhancement, when uplink control information of all SCells is multiplexed and transmitted in PCell's uplink control channel, PCell resources run short. Therefore, in Rel. 13 and later, it may be possible that transmission of the uplink control channel is allowed not only in PCell but also in SCell (PUCCH on SCell). Note that a cell that transmits PUCCH is also called PUCCH cell, and an SCell capable of transmitting PUCCH is also called PUCCH SCell.

As described above, in CA of existing LTE systems, activation/deactivation of SCell is stipulated. The user terminal activates/deactivates SCells based on a command from the radio base station or a predetermined timer. Even when an Scell is activated, the SCell may be deactivated again according to the communication environment etc., so that the power consumption of the user terminal can be suppressed.

When transmission of uplink control channel (PUCCH on SCell) in SCell is allowed, it is possible to deactivate PUCCH SCell. However, in existing LTE systems, the deactivation operation for PCell performing PUCCH transmission is not specified, and therefore how to control the deactivation of the PUCCH SCell is not determined.

One or more embodiments of the present invention provide a user terminal, a radio base station, and a radio communication method capable of appropriately performing communication even when a deactivation operation (deactivation) is applied to a specific cell that transmits an uplink control channel.

According to one or more embodiments of the present invention, even when deactivation operation (deactivation) is applied to a specific cell transmitting an uplink control channel, communication can be performed appropriately.

In accordance with embodiments of the present invention, a user terminal that communicates with a cell group comprised of one or a plurality of cells includes a transmission section that transmits uplink control information using an uplink control channel of a specific secondary cell in the cell group. Further, the user terminal includes a control section that controls a deactivation operation (deactivation) of the secondary cell included in the cell group based on a deactivation command for the secondary cell and/or upon expiration of a deactivation timer. The control section deactivates at least the specific secondary cell within a predetermined period from a subframe in which the deactivation command for the specific secondary cell is reported and/or a subframe in which the deactivation timer expires.

FIG. 1 is a diagram to explain an example of a deactivation operation (deactivation) of a secondary cell (SCell) when adopting CA in an existing LTE system. The user terminal controls the deactivation of SCells based on deactivation commands for SCell. In particular, the user terminal controls the deactivation operation of SCells by receiving deactivation commands for the SCell reported from the radio base station or based on the expiration of a given deactivation timer (sCellDeactivationTimer) controlling deactivation operation. The deactivation command may be called a deactivation command or a deconfiguration command. The deactivation timer may be called a deactivation timer or a deconfiguration timer.

When a deactivation command for SCell is received in one subframe, or when the deactivation timer expires in one subframe, the user terminal performs control to deactivate the SCell during the period from the relevant subframe (for example, subframe n) to a subframe after a predetermined period (for example, subframe n+8). That is, the user terminal controls to stop the Scell at the latest by subframe n+8. As a deactivation operation for the SCell, for example, the user terminal stops the Sounding Reference Signal (SRS)/Uplink Shared Channel (UL-SCH)/Random Access Channel (RACH) transmission in the SCell, stops the Physical Downlink Control Channel (PDCCH) monitoring in the SCell, and stops the PDCCH monitoring for the SCell.

Also, in existing LTE systems, the user terminal flushes the HARQ buffer in the subframe n in which the deactivation command for SCell is received (subframe in which the deactivation command is received or a deactivation timer is expired). Further, the user terminal stops the Channel State Information (CSI) reporting to the SCell in a subframe (for example, subframe n+8) after a predetermined timing since the deactivation command was received.

That is, the user terminal can deactivate the SCell in any subframe from subframe n, in which Scell deactivation command is received to subframe n+8, but the user terminal stops CSI reporting for the SCell only in a specific subframe (for example, subframe n+8). The user terminal can send CSI reporting (for example, periodic CSI reporting) using the uplink control channel or uplink common data channel of a specific cell (for example, PCell).

Note that the specific subframe in which the user terminal stops CSI reporting is not limited to n+8. For example, if periodic CSI reporting is configured in subframe n+8, the user terminal may be controlled to send CSI reports in subframe n+8 and not to send CSI reports from subframe n+9.

By this, the terminal can arbitrarily determine the deactivation timing of SCell, so that it is possible to relax the implementation load/requirement condition of the terminal and, since CSI reporting always stops at a specific timing, the base station can accurately know the timing at which CSI reporting from the terminal stops. If the timing at which SCell is deactivated does not match the timing at which CSI reporting is deactivated, the terminal may send a CSI report on the deactivated SCell. In such a case, the terminal can include an Out of Range (OOR) in the CSI of the SCell.

Figure 2:
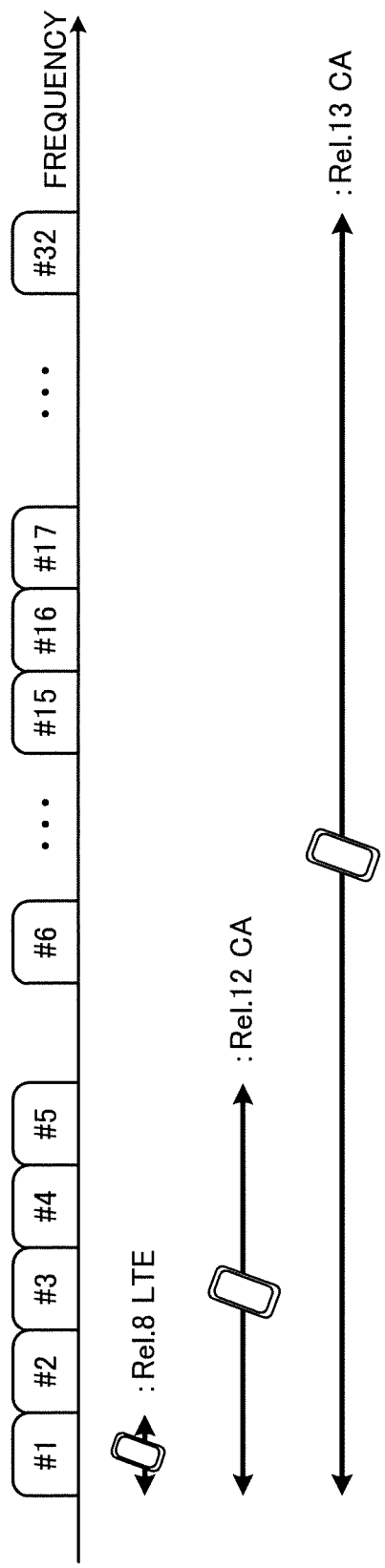
FIG. 2 is a diagram to explain carrier aggregation.

By the way, in the future wireless communication system in after Rel. 13, it is assumed that the number of CCs that can be used in CA will be expanded (see FIG. 2). As shown in FIG. 2, in CA up to LTE Rel. 12, a maximum of five component carriers (CCs) (CC #1 to CC #5) are bundled, where a predetermined bandwidth constitutes the fundamental unit (for example, the system band in LTE Rel. 8). That is, in CA up to LTE Rel. 12, the number of CCs that can be configured per UE is limited to a maximum of five.

On the other hand, in CA of LTE Rel. 13, a study is in progress to expand the bandwidth further by bundling six or more CCs. That is, in CA of LTE Rel. 13, expansion of the number of CCs (cells) that can be configured per UE to six or more (CA enhancement) is being studied. For example, as shown in FIG. 2, when 32 CCs (CC #1 to CC #32) are bundled, a bandwidth of maximum 640 MHz can be secured.

More flexible and faster radio communication is expected to be made possible by thus reducing the limit on the number of CCs that can be configured per UE. Also, expanding the number of CCs like this is an effective way to widen the band based on CA (License-Assisted Access (LAA)) between licensed bands and unlicensed bands. For example, five licensed band CCs (=100 MHz) and fifteen unlicensed band CCs (=300 MHz) are bundled, and a bandwidth of 400 MHz can be secured.

In this way, when the number of CCs is expanded, as in CA in existing systems, when uplink control information of all SCells is transmitted on the PCell's uplink control channel (for example, PUCCH), the resources of the uplink control channel of the PCell run short. Therefore, if the number of CCs is expanded, in addition to PCell, it is effective to transmit an uplink control channel also in a predetermined SCell (PUCCH on SCell).

When sending PUCCH with a predetermined SCell, it is conceivable to control communication by configuring a cell group (CG) including at least one cell and configuring specific cells transmitting an uplink control channel in each cell group. In each cell group, the cell that transmits the uplink control channel is also called PUCCH Cell, PUCCH SCell, PUCCH cell, PSCell and so on.

Figure 3:
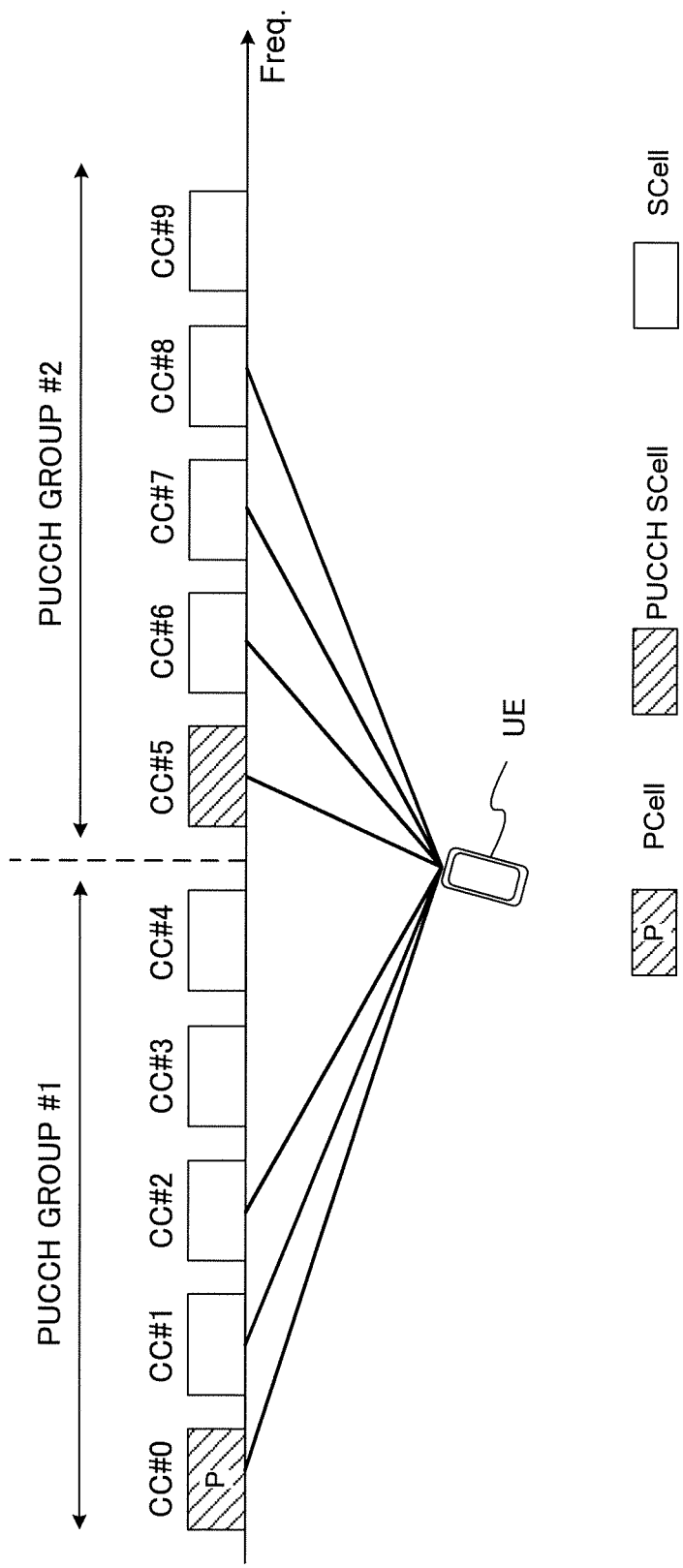
FIG. 3 is a diagram to show an example of a PUCCH cell group.

In the case shown in FIG. 3, the user terminal communicates using PUCCH groups in which at least one or more cells are configured (in this case, two of PUCCH group #1 and PUCCH group #2). In the case shown in FIG. 3, CCs #0 to #2 included in first PUCCH group #1 are activated and CCs #5 to #8 included in second PUCCH group #2.

In first PUCCH group #1, the primary cell (CC #0) corresponds to the PUCCH Cell that performs PUCCH transmission, and, in second PUCCH group #2, a specific SCell (CC #5) corresponds to a PUCCH cell (also referred to as PUCCH SCell) that performs PUCCH transmission. Also, it is possible to use a configuration in which only one PUCCH cell is configured in each PUCCH group. The number of PUCCH groups to which user terminals connect and the number of CCs included in each PUCCH group are not limited to the configuration shown in FIG. 3. Each PUCCH group is also called PUCCH cell group, cell group, or CG.

In this way, when a user terminal communicates with a plurality of PUCCH groups, carrying out deactivation operation of SCell depending the communication environment is effective from the viewpoint of reducing power consumption. Also, when PUCCH transmission is allowed in SCell, it may be possible to apply the deactivation operation also to SCells that perform PUCCH transmission (PUCCH SCell).

When PUCCH SCell is deactivated, it may be possible that all the SCells in the PUCCH group in which the PUCCH SCell is the PUCCH Cell are similarly deactivated. This is because when the PUCCH SCell is deactivated, uplink control information of other SCells included in the same PUCCH group cannot be transmitted on the PUCCH SCell.

On the other hand, in existing LTE systems, the deactivation operation for PCells that transmit the PUCCH is not specified. Therefore, when the user terminal deactivates PUCCH SCell, how to control the deactivation operation (for example, deactivation timing, etc.) is required to be clarified.

From the viewpoint of reducing the power consumption of the user terminal, it is effective to deactivate PUCCH SCell at the timing of the deactivation command. On the other hand, the PUCCH SCell also transmits uplink control information (for example, HARQ-ACK, channel state information (CSI), etc.) of the SCells included in the same CG in addition to the uplink control information of the subject cell. Therefore, if the user terminal performs control to fixedly deactivate the PUCCH SCell at the timing when a PUCCH SCell deactivation command is received (subframe n), there is a possibility that communication cannot be performed properly.

In view of the above, according to embodiments of the present invention, a user terminal may control deactivation of a PUCCH SCell not only when a PUCCH SCell deactivation command is received (the timing at which the deactivation command is received or the timing at which the deactivation timer expires), but also within a predetermined period after the deactivation command is received (before a predetermined subframe timing). This allows the user terminal to flexibly control the deactivation timing of the PUCCH SCell even if it receives a PUCCH SCell deactivation command.

As mentioned above, when deactivating a PUCCH SCell, it is desirable to control such that other SCells included in the PUCCH group in which the PUCCH SCell is the PUCCH cell also may be stopped. In this case, the user terminal may deactivate other SCells like SCells in existing LTE systems.

Figure 4:
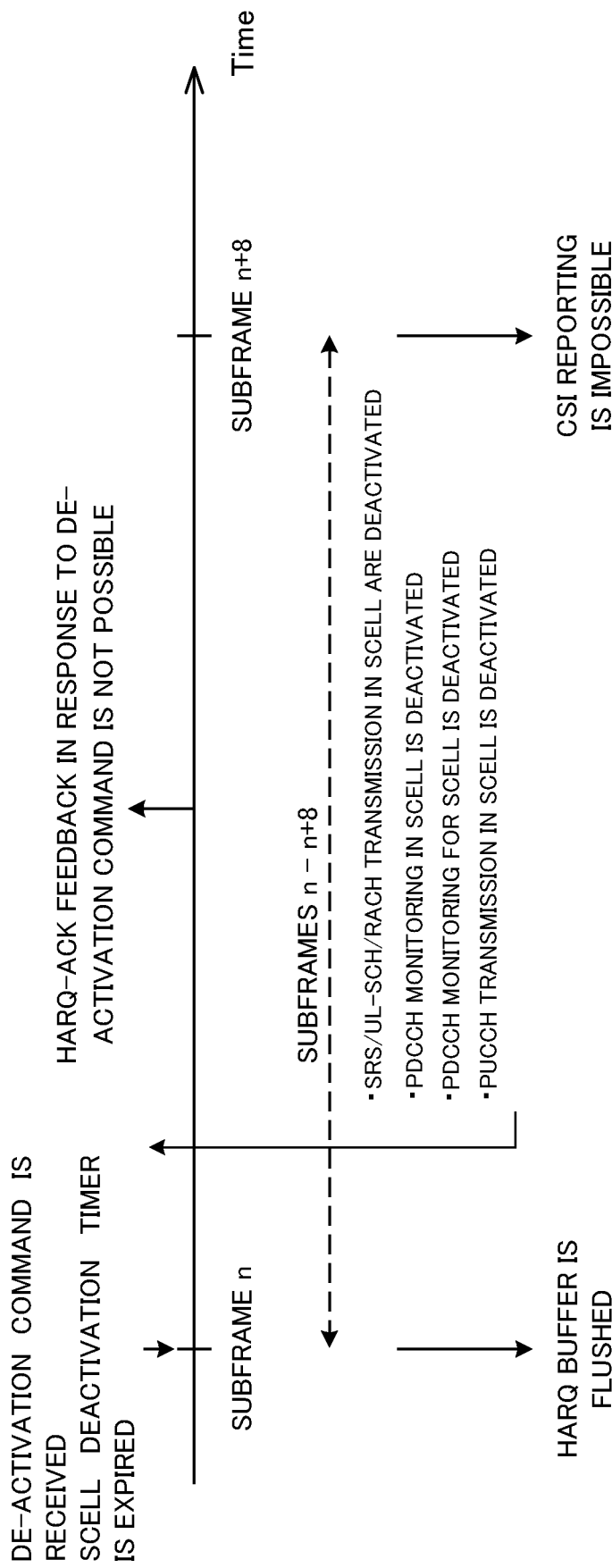
FIG. 4 is a diagram to show an example of deactivation of a PUCCH SCell.

However, in this case, there is a possibility that the deactivation timing of the PUCCH SCell may be earlier than the subframe (for example, subframe n+8) after a predetermined period of time from the subframe n where the deactivation command is received. In such a case, due to the deactivation of the PUCCH SCell, the PUCCH SCell cannot transmit the PUCCH, and therefore CSI reports of other SCells that continue until subframe n+8 cannot be sent (see FIG. 4).

In view of the above, according to embodiments of the present invention, CSI reporting of all SCells included in the same PUCCH group may be stopped at the same time as or before the timing to deactivate a PUCCH Scell. In accordance with embodiments of the present invention, after a PUCCH SCell is deactivated by the user terminal, alternatively, CSI reports of SCells included in the same PUCCH group may be transmitted on the PUCCH of another CG cell (for example, PCell) different from the CG.

Also, the user terminal may stop the PUCCH SCell before the subframe n+k based on deactivation commands in the subframe n. In this case, if a PUCCH SCell deactivation command is transmitted in the serving cell of the same PUCCH group, HARQ-ACK in response to the PUCCH SCell deactivation command cannot be transmitted in the subframe n+k (see FIG. 4). Note that "k" indicates feedback timing of HARQ-ACK, which is k=4 in FDD, and this is a value determined by the UL/DL configuration, the UL subframe index, etc., in Time Division Duplex (TDD).

In view of the above, according to embodiments of the present invention, a PUCCH SCell deactivation command may be controlled to be transmitted to the user terminal with the serving cell of the PUCCH group not including the deactivating PUCCH SCell. The user terminal can control the UE operation (for example, receiving operation, cell deactivation operation. etc.) based on the assumption that a PUCCH SCell deactivation command is not transmitted in the cell of the CG including the PUCCH SCell.

Alternatively, according to embodiments of the present invention, the user terminal may not need to transmit the HARQ-ACK in response to the PUCCH SCell deactivation command. That is, the user terminal receives a PUCCH SCell deactivation command at one of the serving cells including the PUCCH SCell, and, in the case where the user terminal deactivates a PUCCH SCell in the period from reception of a PUCCH SCell deactivation command to HARQ-ACK transmission timing (subframe n+k), the user terminal can be controlled not to transmit the HARQ-ACK in response to the deactivation command. By doing this, the user terminal can complete the deactivation process of the PUCCH SCell at an earlier timing without considering the HARQ-ACK transmission timing. Further, even if HARQ-ACKs from the user terminal to which a PUCCH SCell deactivation command has been transmitted from the radio base station cannot be accurately received, the base station can assume that the user terminal has deactivated a PUCCH SCell, and perform subsequent scheduling accordingly.

Embodiments of the present invention will be described below in detail. Although the present disclosure describes the case where the user terminal stops the PUCCH SCell by subframe n+8 after the user terminal receives a PUCCH SCell deactivation command in subframe n, the timing to deactivate a PUCCH SCell is not limited thereto. Also, when receiving a PUCCH SCell deactivation command, other SCells included in the same CG may be controlled to be stopped at the same timing as PUCCH SCell or different activation timings may be employed per cell.

A deactivation operation (deactivation) for PUCCH SCell in accordance with one or more embodiments of the invention may, for example, involve the user terminal: stopping the SRS/UL-SCH/RACH transmission in the PUCCH SCell; stopping the PDCCH monitoring in the PUCCH SCell; stopping the PDCCH monitoring for the PUCCH SCell; and transmitting the PUCCH transmission in the PUCCH SCell. This is merely one example of a deactivation operation and is not intended to be limiting to the scope of the invention.

For example, if PUCCH SCell is configured, the user terminal may include the power headroom (PHR) (Type 1 PHR) when PUSCH transmission is performed and the PHR (Type 2 PHR) when simultaneous PUCCH-PUSCH transmission is configured, as a PHR report, and report this in MAC CE. In this case, at the time of deactivation of the PUCCH SCell, control may be performed so that Type 1 PHR and Type 2 PHR of the PUCCH SCell cannot be included in the MAC CE. Note that which serving cell that the PHR included in the MAC CE corresponds to may be reported to the base station in the form of a bit map in another area within the MAC CE.

FIRST EXAMPLE

In a First Example in accordance with embodiments of the invention, assuming the case where the user terminal deactivates a PUCCH SCell from the timing when a PUCCH SCell deactivation command is received until the timing after a predetermined period of time, a method of controlling transmission of CSI reporting of SCells included in the same PUCCH group (hereinafter also referred to as "CG") will be described.

<CSI Report Timing Control>

At the same time as deactivation of a PUCCH SCell or before deactivation of a PUCCH SCell, the user terminal performs control so that the CSI reports of SCells included in the same PUCCH group as that of the PUCCH SCell are also stopped.

In this case, if a deactivation command for a normal SCell without PUCCH transmission is received (when a deactivation command is received or when the deactivation timer has expired), the user terminal deactivates the SCell in a subframe before a predetermined subframe (for example, subframe n+8), and the user terminal also stops CSI reporting in subframe n+8 (or CSI reporting is stopped after being continued until subframe n+8). On the other hand, if a PUCCH SCell deactivation command is received, the user terminal does not continue the CSI reporting of SCells included in the same CG until n+8, and the user terminal also controls the deactivation of CSI reporting based on the timing to deactivate the PUCCH SCell.

Furthermore, when the normal SCell deactivation operation included in the same CG as the PUCCH SCell is performed simultaneously with the deactivation timing of the PUCCH SCell, only CSI reporting of CG containing PCell is always stopped at subframe n+8.

FIG. 5A shows the deactivation timing in normal SCell (SCells that are not PUCCH SCells) and the timing to stop CSI reporting. FIG. 5B shows the deactivation timing in PUCCH SCell and the deactivation timing of CSI reporting in SCells included in the same CG.

In the case shown in FIG. 5A, when the user terminal receives a deactivation command for a normal SCell or when the deactivation timer expires in the subframe n, the SCell is deactivated in subframe n+5. In this case, the user terminal continues sending CSI reporting up to subframe n+8 for (CSI reporting after subframe n+8 is not performed).

In the case shown in FIG. 5B, the PUCCH SCell is deactivated in subframe n+5 when the user terminal receives a PUCCH SCell deactivation command in subframe n or when the deactivation timer expires. In this case, the user terminal performs control so that CSI reporting of the PUCCH SCell and/or SCell of the same group stops simultaneously with the timing to deactivate the PUCCH SCell. Also, the user terminal may stop CSI reporting before the timing to deactivate PUCCH SCell (subframe n+5 in FIG. 5B).

Thus, when the user terminal deactivates PUCCH Cell, the user terminal controls the timing of the CSI reporting of SCells included in the same CG based on the timing to stop the PUCCH Cell. As a result, the user terminal does not have to wait until a predetermined timing (for example, subframe n+8) at which CSI reporting is deactivated, and the user terminal can deactivate the PUCCH SCell at an arbitrary timing before the predetermined timing. This makes it possible to relax the mounting requirement condition, reduce the circuit scale, and lower the cost. Furthermore, it is possible to prevent the user terminal from sending the CSI report at unexpected cell or timing of the base station.

<Control of Cells Performing CSI Reporting>

When PUCCH SCell is deactivated, the user terminal can perform control so that the CSI reporting of SCells included in the same CG is sent using the PUCCH cell in a PUCCH group different from the CG. For example, when the user terminal deactivates PUCCH SCell (CC #5 in FIG. 3) of a certain PUCCH group (for example, CG #2 of FIG. 3), the CSI report of SCells included in the CG (CC #5-CC #8 of FIG. 3) is sent using the uplink control channel of the PUCCH cell (CC #0 of FIG. 3) of another CG (CG 1 of FIG. 3).

Figure 6:
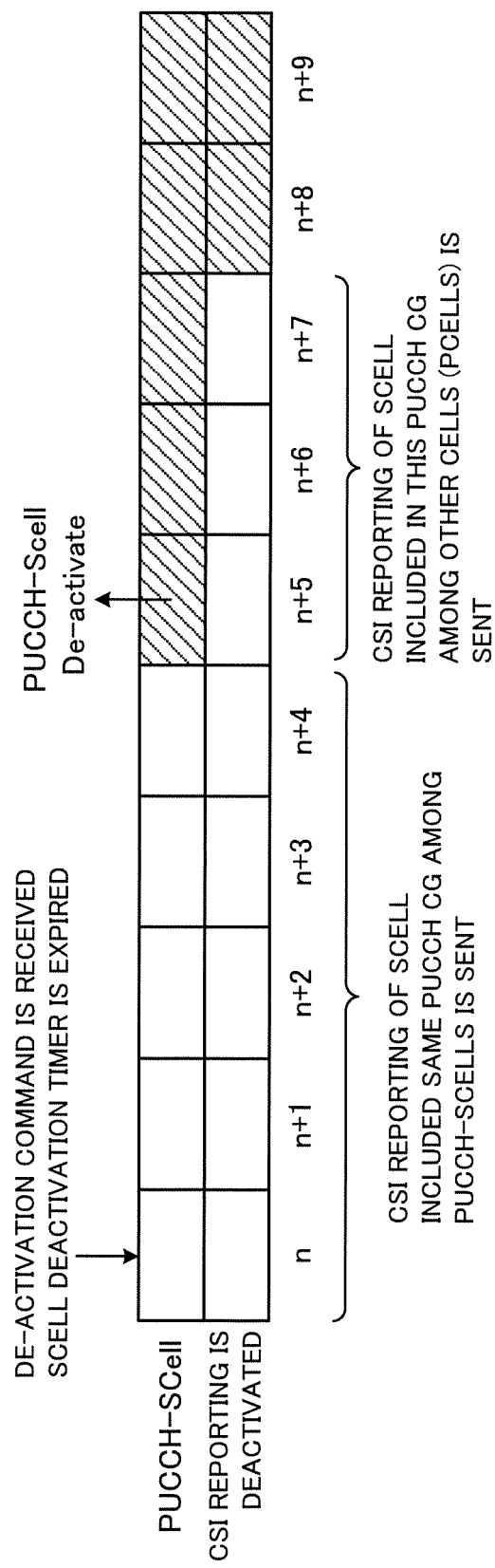
FIG. 6 is a diagram to show another example of deactivation in the First Example in accordance with embodiments of the invention.

FIG. 6 illustrates the deactivation timing in the PUCCH SCell and the transmission method of sending CSI reporting for SCells included in the same CG. In the case shown here, the user terminal receives a PUCCH SCell deactivation command in subframe n, the user terminal deactivates a PUCCH SCell in subframe n+5. In this case, the user terminal performs control so that the CSI report of SCell in subframe n+5 and beyond is sent in PUCCH Cell (for example, PCell) of another CG.

On the other hand, before the timing to deactivate PUCCH SCell (here, up to subframe n+4), the user terminal can send SCells' CSI reports on the uplink control channel of the PUCCH SCell.

Thus, when the PUCCH Cell is deactivated, by sending the CSI reports of SCells included in the same CG at least at the PUCCH cell of another CG after the PUCCH cell is deactivated, SCells' CSI reports can be sent regardless of the PUCCH SCell's deactivation timing.

SECOND EXAMPLE

In a Second Example in accordance with embodiments of the invention, the transmission method of HARQ-ACKs in response to a deactivation command commanding deactivation of a PUCCH SCell to a user terminal will be described.

<Control of Cell Performing HARQ-ACK>

The network (for example, the radio base station) is configured so that a PUCCH SCell deactivation command is transmitted to the user terminal in a serving cell of another CG not including the target PUCCH SCell of the deactivation command. For example, in FIG. 3, when commanding the user terminal to deactivate a PUCCH SCell (CC #5), the radio base station transmits a deactivation command in serving cells (CC #0 to CC #2) of CG #1.

When the user terminal receives a deactivation command for a predetermined PUCCH SCell from a cell of another CG, the user terminal performs the deactivation operation of the PUCCH SCell by a predetermined timing (for example, subframe n+8). In this case, the user terminal can control the UE operation (reception operation, deactivation operation, etc.) based on the assumption that a PUCCH SCell deactivation command is not transmitted in the serving cells of the CG including the PUCCH SCell.

Further, the user terminal feeds back the HARQ-ACK to the deactivation command using the PUCCH Cell (CC #0 in FIG. 3) in the CG including the serving cell that received the deactivation command.

Thus, when the PUCCH Cell is deactivated using the deactivation command, the deactivation command is transmitted in a cell of a CG different from the CG to which the deactivated PUCCH Cell belongs, so that HARQ-ACK for deactivation command can be sent regardless of deactivation timing of PUCCH SCell. By doing this, the radio base station can confirm whether the user terminal correctly received the deactivation command, and can perform the subsequent scheduling appropriately.

<Control of Transmission/Non-Transmission of HARQ-ACK>

Alternatively, when the user terminal receives a deactivation command for a predetermined PUCCH SCell in a CG not including the PCell and deactivates the PUCCH SCell before the timing to transmit an HARQ-ACK in response to the deactivation command, control may be performed so that the user terminal does not transmit an HARQ-ACK. In other cases, the user terminal can control to transmit HARQ-ACK in PUCCH SCell.

By determining whether or not to transmit a HARQ-ACK in response to the PUCCH SCell deactivation command based on the deactivation timing of the PUCCH SCell in this manner, when receiving a deactivation command, the user terminal can stop the PUCCH SCell at an arbitrary timing without waiting for HARQ-ACK transmission, so that it is possible to reduce the implementation load. Furthermore, it is possible to suppress wasteful HARQ-ACK transmission.

THIRD EXAMPLE

In a Third Example in accordance with embodiments of the invention, a case will be described in which control is performed so that the user terminal stops the PUCCH SCell at the timing after a PUCCH SCell deactivation command is received in the subframe n and a HARQ-ACK in response to the deactivation command is transmitted.

When deactivation of a PUCCH SCell is commanded in subframe n, the user terminal deactivates a PUCCH SCell after the subframe n+k+1. Note that k represents feedback timing of HARQ-ACK, and, in FDD, k=4 can be used, while, in the case of TDD, k can be determined based on the UL/DL configuration and the number of UL subframes.

Also, when deactivation of a PUCCH SCell is commanded in subframe n, the user terminal deactivates PUCCH SCell in subframe n+k+1 at the shortest time, or later. In this case, the slowest subframe for deactivating PUCCH SCell may be further defined. For example, subframe n+8 can be the slowest subframe to deactivate PUCCH SCell.

Thus, when deactivation of a PUCCH SCell is commanded in subframe n, the user terminal deactivates a PUCCH SCell after the subframe n+k+1, so that the user terminal can secure the opportunity to transmit a HARQ-ACK in response to the deactivation command. By doing this, the base station can confirm whether the user terminal correctly received the deactivation command, and can perform the subsequent scheduling appropriately.

Note that when the user terminal deactivates a PUCCH SCell after the subframe n+k+1, the user terminal may as well perform the deactivation before a predetermined subframe (for example, n+8). In such a case, the CSI reports of SCells included in the same CG as the PUCCH SCell cannot be sent at the timing defined by the existing system (for example, subframe n+8). In this case, the user terminal controls the CSI reporting by the method shown in the First Example, so that, in addition to HARQ-ACK transmission, the user terminal can also properly perform SCell CSI reporting.

Depending on the UL/DL configuration of TDD, the feedback timing of HARQ-ACK may be k>8. In this case, if the slowest subframe (for example, subframe n+8) to deactivate the PUCCH SCell is specified, the situation might arise where an HARQ-ACK in response to the deactivation command cannot be transmitted in the subframe n+k. In this case, the user terminal controls the HARQ-ACK transmission by the method shown in the second example, so that the user terminal can appropriately perform the HARQ-ACK transmission even when k>8.

FOURTH EXAMPLE

In a Fourth Example in accordance with embodiments of the invention, a case will be described in which control is performed so that, when the user terminal receives a PUCCH SCell deactivation command in subframe n or the deactivation timer expires in subframe n, the user terminal deactivates a PUCCH SCell in a specific subframe after a predetermined period of time.

For example, when deactivation of a PUCCH SCell is commanded in subframe n, the user terminal deactivates a PUCCH SCell in a specific subframe (for example, subframe n+8) (method 1). In this case, the user terminal can deactivate the PUCCH SCell at the same timing as stopping SCells' CSI reports in the existing system. This allows SCells' CSI reports to be sent properly even when PUCCH SCell is deactivated. In SCells other than PUCCH SCell, as in conventional SCell deactivation, CSI reporting is stopped in a specific subframe (for example, subframe n+8), and other deactivation processes may be performed at an arbitrary timing before a specific subframe (for example, subframe n+8).

Alternatively, if deactivation of a PUCCH SCell is commanded in subframe n, the user terminal deactivates a PUCCH SCell in a specific subframe (for example, n+k+1) (method 2). In this case, the user terminal can secure the opportunity to transmit the HARQ-ACK to a PUCCH SCell deactivation command and can appropriately transmit an HARQ-ACK.

Also, the user terminal can control the deactivation timing of the PUCCH SCell by selecting the shorter one of method 1 and method 2 (method 3). By doing this, it is possible to effectively suppress the power consumption of the user terminal.

Depending on the UL/DL configuration of TDD, the feedback timing of HARQ-ACK may be k>8. When method 1 in which deactivation timing of PUCCH SCell is n+8 is used, it may occur that an HARQ-ACK for a deactivation command cannot be transmitted in subframe n+k. In this case, the user terminal controls the transmission of the HARQ-ACK by applying the method shown in the second example, and, by doing so, the user terminal can appropriately transmit an HARQ-ACK even when k>8.

Alternatively, from the viewpoint of reliably transmitting SCells' CSI reports and HARQ-ACKs in response to deactivation commands, the user terminal may control the deactivation timing of PUCCH SCells by selecting the longer one of method 1 and method 2.

FIFTH EXAMPLE

In a Fifth Example in accordance with embodiments of the invention, a case to control the deactivation operation of the PUCCH SCell using, in addition to the deactivation command and/or the deactivation timer, a PUCCH SCell timing advance timer (TA timer) will be explained.

In the LTE system, a timing advance timer (TA timer) that controls uplink synchronization (sync) and asynchronization (unsync) is configured in cells. In cells where the TA timer has not expired, the user terminal can perform UL transmission (transmission of PUCCH, PUSCH, uplink measurement reference signal (SRS) etc.). On the other hand, in cells where the TA timer has expired, the user terminal cannot perform UL transmission other than PRACH transmission.

When the TA timer is configured in a PUCCH SCell, UL transmission (PUCCH, PUSCH transmission, etc.) is restricted when the TA timer of the PUCCH SCell expires. In such a case, the PUCCH SCell is able to be stopped earlier. Furthermore, in accordance with embodiments of the present invention, the deactivation of a PUCCH Scell is controlled, taking into account the TA timer, in addition to a PUCCH SCell deactivation command.

<When the TA Timer is Expired at the Start of Deactivation Operation>

Figure 7A:
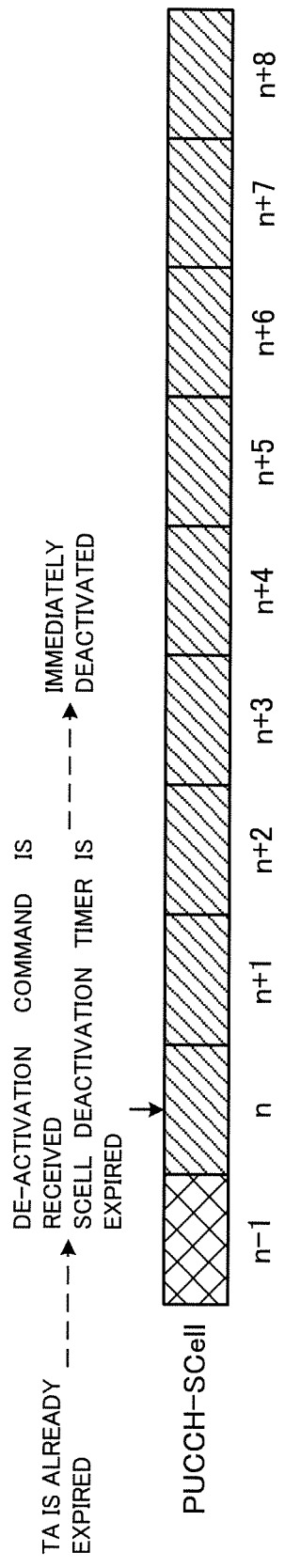
FIG. 7A and FIG. 7B are diagrams to show an example of deactivation in the Fifth Example in accordance with embodiments of the invention.

Assume that a PUCCH SCell is in the UL unsync state at the deactivation operation start point (for example, subframe n) of the PUCCH SCell (the TA timer has expired). In such a case, the user terminal can deactivate the PUCCH SCell in subframe n where the deactivation of the PUCCH SCell is commanded (see FIG. 7A). The deactivation operation start time of the PUCCH SCell may be the timing at which a PUCCH SCell deactivation command is received, or may be the timing at which the deactivation timer expires.

Alternatively, the user terminal may deactivate PUCCH SCell in the next subframe (subframe n+1) of subframe n in which the deactivation of the PUCCH SCell is commanded.

Figure 7B:
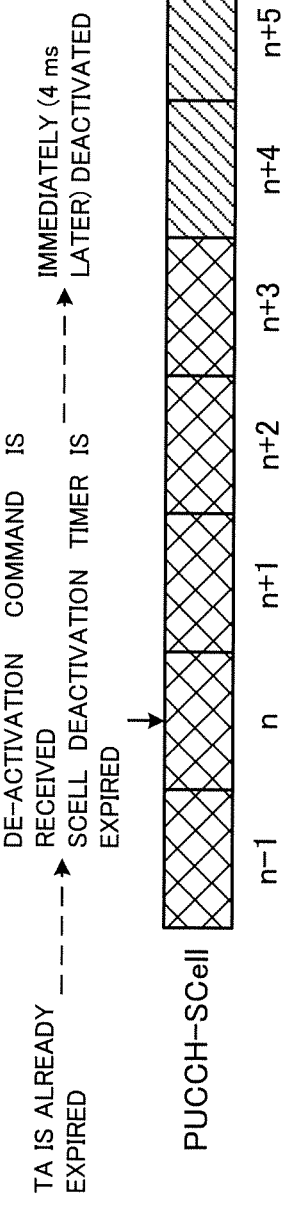

Alternatively, considering the decoding delay of MAC CE, the user terminal may deactivate PUCCH SCell four subframes (subframe n+4) after subframe n in which the deactivation of a PUCCH SCell is commanded (see FIG. 7B).

Thus, if there is a PUCCH SCell that has already stopped UL transmission other than PRACH transmission, by deactivating the PUCCH SCell at the timing when the deactivation command is issued, it becomes possible to suppress the power consumption of the user terminal.

<When the TA Timer Expires after Starting Deactivation Operation>

Figure 8:
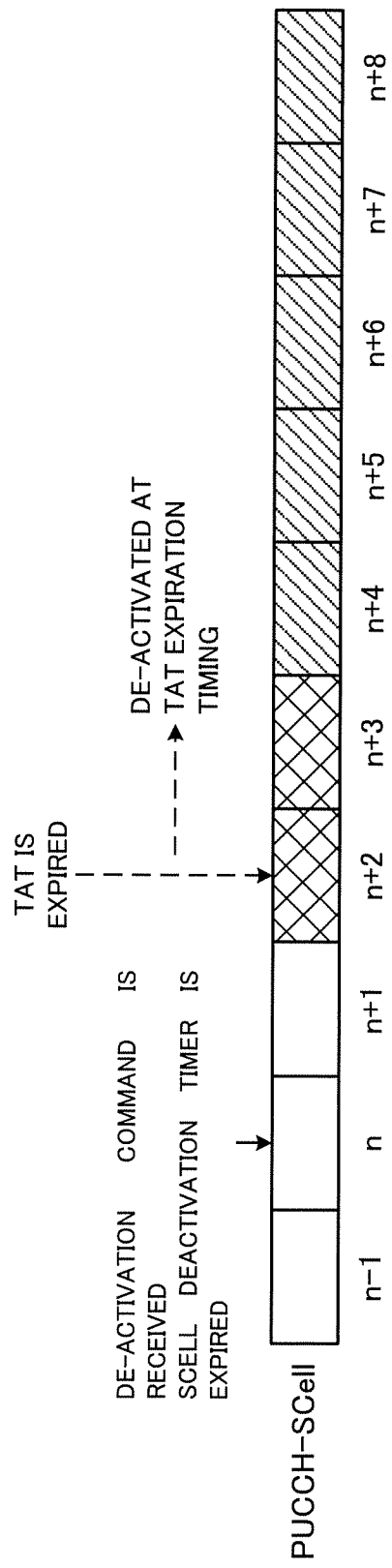
FIG. 8 is a diagram to show another example of deactivation in the Fifth Example in accordance with embodiments of the invention.

Assume that a PUCCH SCell UL is in unsync state (TA timer has expired) before completion of deactivation operation of the PUCCH SCell. In this case, the user terminal can deactivate the PUCCH SCell at an earlier timing of the deactivation operation completion and the TA timer expiration (see FIG. 8). In the case shown in FIG. 8, a PUCCH SCell deactivation command is received in subframe n or the deactivation timer expires, and the TA timer expires in subframe n+2.

Even if the deactivation operation by the user terminal is to be completed in the subframe n+4 based on deactivation commands, if the expiration of the TA timer is earlier than the subframe n+4, the user terminal deactivates a PUCCH SCell at the timing of the expiration of the TA timer. That is, the user terminal regards the point of time when UL transmission deactivation is completed as the PUCCH SCell deactivation timing and operates.

In this way, by controlling the deactivation timing of the PUCCH SCell in consideration of the expiration of the TA timer in addition to PUCCH SCell deactivation command, PUCCH SCell can be stopped at an early timing. This makes it possible to reduce the power consumption of the user terminal.

(Radio Communication System)

Now, the structure of the radio communication system according to embodiments of the present invention will be described below. In this radio communication system, the radio communication methods of the above-described embodiments are employed. Note that the radio communication methods of the above-described embodiments may be applied individually or may be applied in combination.

Figure 9:
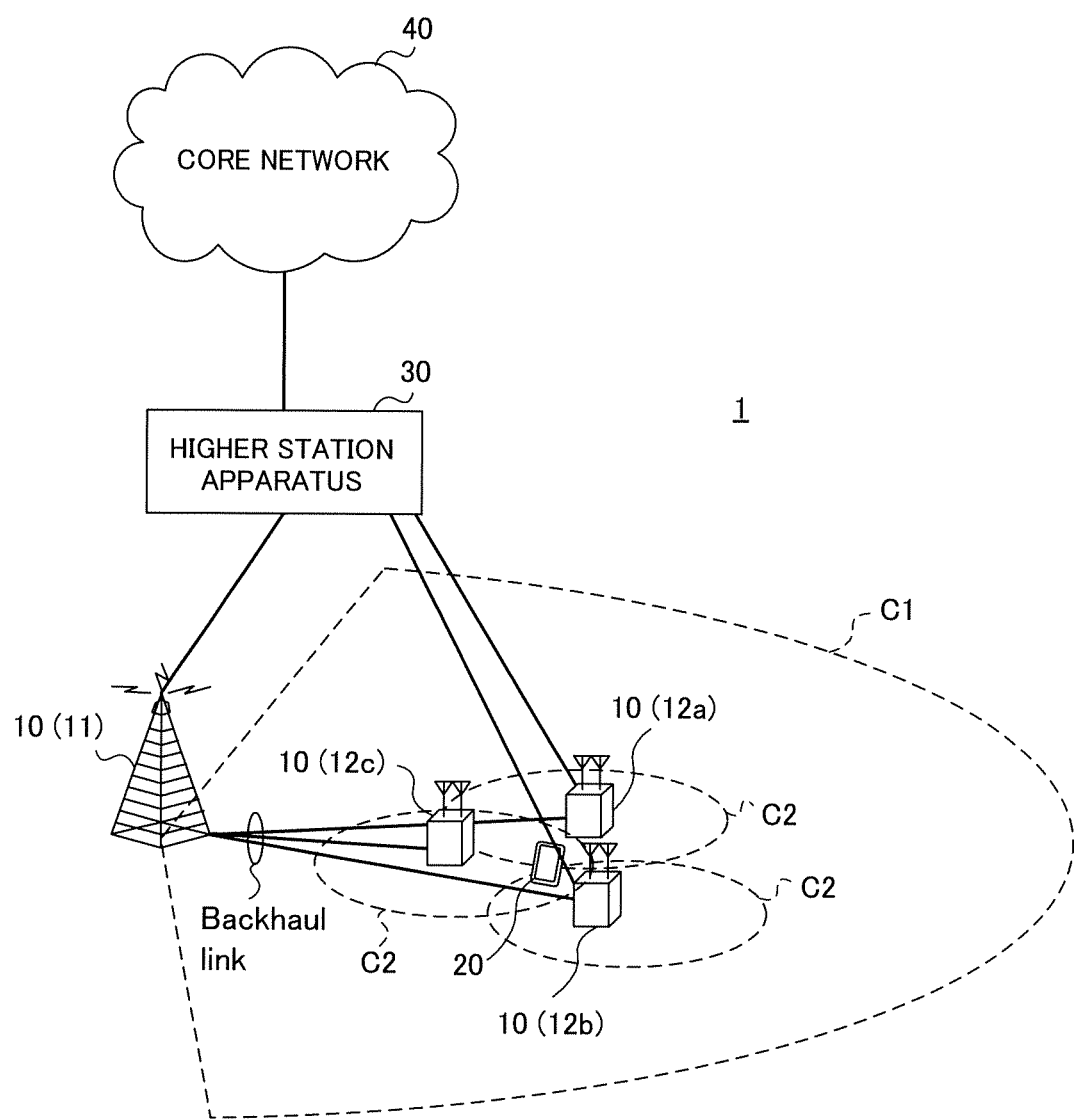
FIG. 9 is a diagram to show an example of a schematic structure of a radio communication system in accordance with embodiments of the present invention.

FIG. 9 is a diagram to show an example of a schematic structure of a radio communication system according to embodiments of the present invention. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 shown in FIG. 9 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that is used in the radio base station 11 may be used. Note that the configuration of the frequency band for use in each radio base station is by no means limited to these.

A structure may be employed here in which wired connection (for example, means in compliance with the Common Public Radio Interface (CPRI) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNodeB (eNB)," a "transmitting/receiving point" and so on. Also, the radio base stations 12 are radio base stations having local coverages, and may be referred to as "small base stations," "micro base stations," "pico base stations," "femto base stations," "Home eNodeBs (HeNBs)", "Remote Radio Heads (RRHs)", "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, Orthogonal Frequency Division Multiple Access (OFDMA) is applied to the downlink, and Single-Carrier Frequency Division Multiple Access (SC-FDMA) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and OFDMA may be used in the uplink.

In the radio communication system 1, a downlink shared channel (Physical Downlink Shared Channel (PDSCH)), which is used by each user terminal 20 on a shared basis, a broadcast channel (Physical Broadcast Channel (PBCH)), downlink L1/L2 control channels and so on are used as downlink channels. User data, higher layer control information and predetermined System Information Blocks (SIBs) are communicated in the PDSCH. Also, the Master Information Blocks (MIB) is communicated in the PBCH.

The downlink L1/L2 control channels include downlink control channels (the Physical Downlink Control Channel (PDCCH) and/or the Enhanced Physical Downlink Control Channel (EPDCCH)), the Physical Control Format Indicator Channel (PCFICH), the Physical Hybrid-ARQ Indicator Channel (PHICH) and so on. Downlink control information (DCI) including PDSCH and PUSCH scheduling information is communicated by the PDCCH. The number of OFDM symbols for use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (Physical Random Access Channel (PRACH)) and so on are used as uplink channels. User data and higher layer control information are communicated by the PUSCH. Uplink control information (Uplink Control Information (UCI)), including at least one of delivery acknowledgment information (ACK/NACK) and radio quality information (Channel Quality Indicator (CQI)), is transmitted by the PUSCH or the PUCCH. By means of the PRACH, random access preambles for establishing connections with cells are communicated.

<Radio Base Station>

Figure 10:
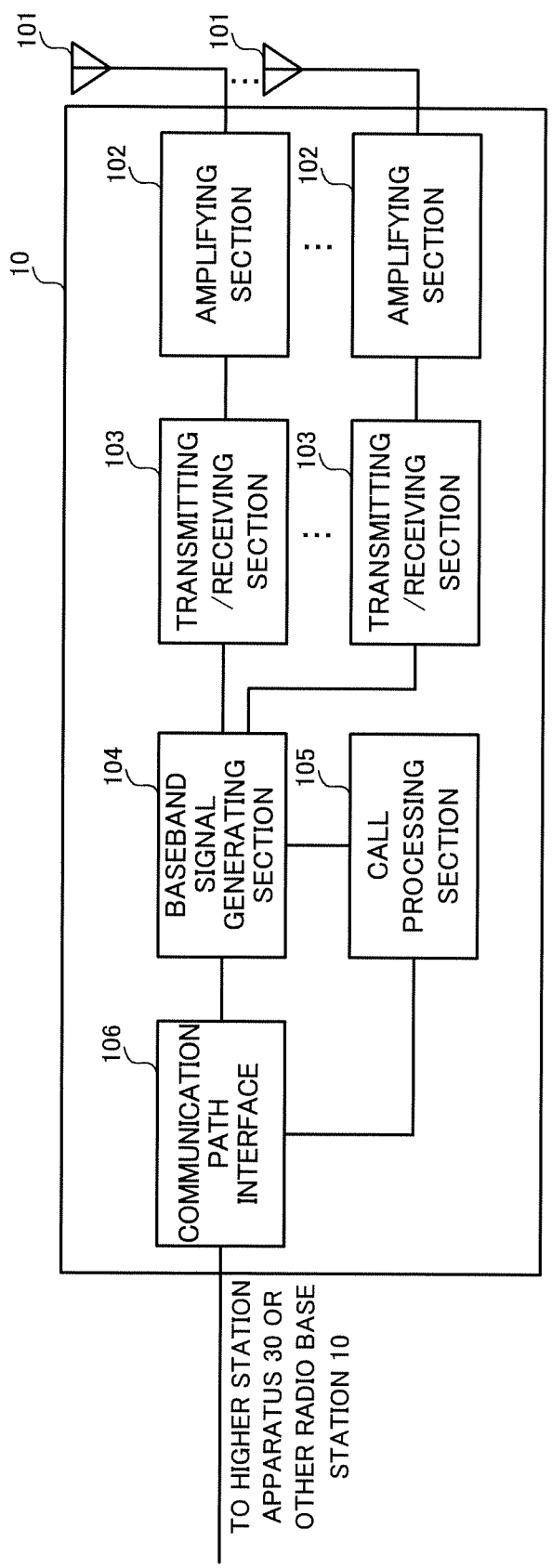
FIG. 10 is a diagram to show an example of a functional structure of a radio base station in accordance with embodiments of the present invention.

FIG. 10 is a diagram to show an example of an overall structure of a radio base station according to embodiments of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a Packet Data Convergence Protocol (PDCP) layer process, user data division and coupling, Radio Link Control (RLC) layer transmission processes such as RLC retransmission control, Medium Access Control (MAC) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving section (receiving section) 103 receives the uplink control information transmitted from the user terminal on the uplink control channel of the specific cell. Further, the transmission/receiving section (transmission section) 103 transmits a deactivation command to a specific cell (PUCCH SCell). As would be understood by a person skilled in the art, the transmitting/receiving sections 103 may be any type of device capable of performing the transmission and reception functions, for example, transmitters/receivers, transmitting/receiving circuits, or transmitting/receiving devices. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (backhaul signaling) with other radio base stations 10 via an inter-base station interface (for example, an interface in compliance with the Common Public Radio Interface (CPRI), such as optical fiber, the X2 interface, etc.).

Figure 11:
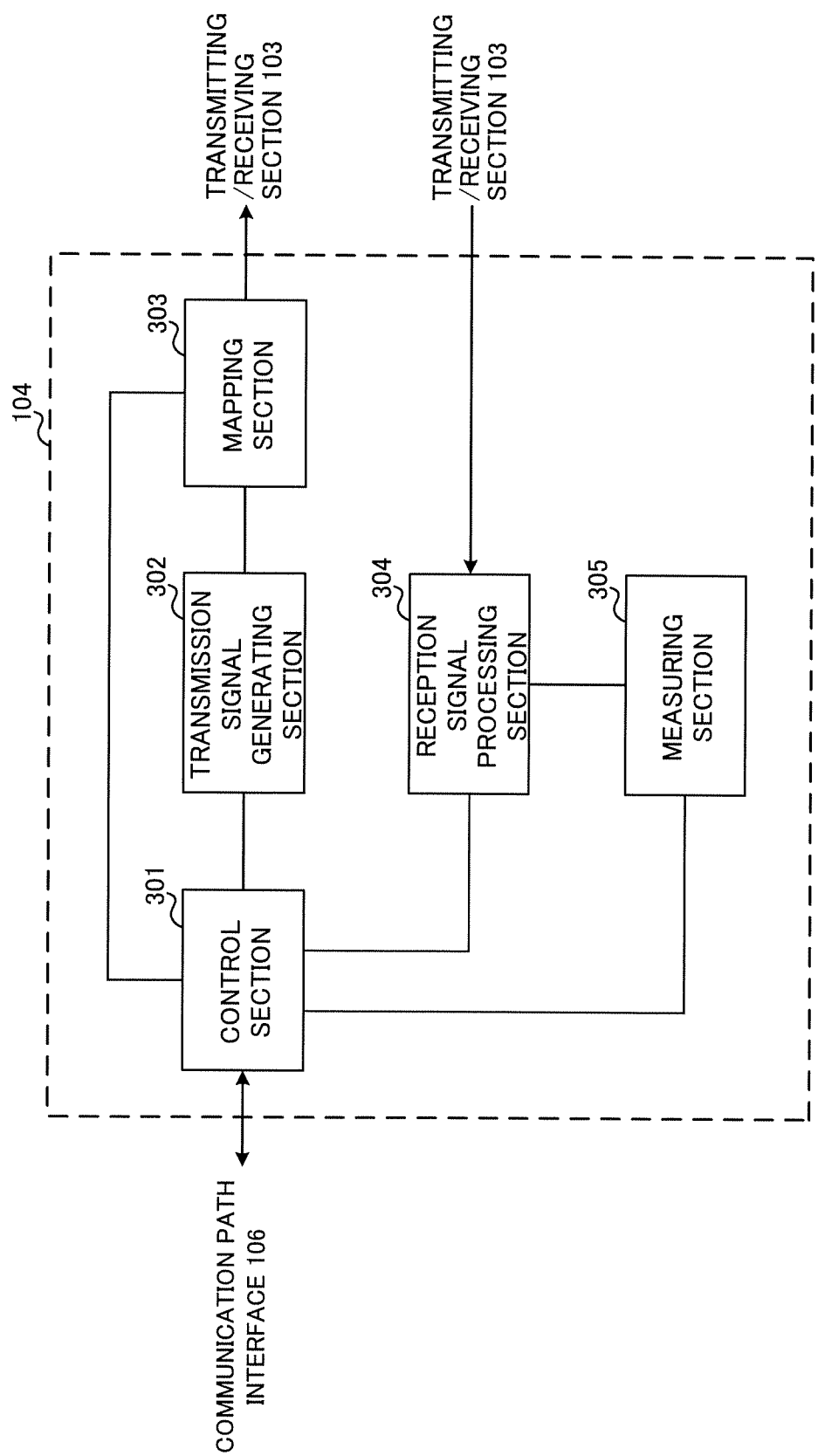
FIG. 11 is a diagram to show an example of a functional structure of a radio base station in accordance with embodiments of the present invention.

FIG. 11 is a diagram to show an example of a functional structure of a radio base station according to the present embodiment. Note that, although FIG. 11 primarily shows functional blocks that pertain to characteristic parts of the present embodiment, the radio base station 10 has other functional blocks that are necessary for radio communication as well. As shown in FIG. 11, the baseband signal processing section 104 has a control section (scheduler) 301, a transmission signal generating section (generating section) 302, a mapping section 303, a received signal processing section 304 and a measurement section 305.

The control section (scheduler) 301 controls the scheduling (for example, resource allocation) of downlink data signals that are transmitted in the PDSCH and downlink control signals that are communicated in the PDCCH and/or the EPDCCH. Also, the control section 301 controls the scheduling of system information, synchronization signals, paging information, Cell-specific Reference Signals (CRSs), Channel State Information Reference Signals (CSI-RSs) and so on. Furthermore, the control section 301 also controls the scheduling of uplink reference signals, uplink data signals that are transmitted in the PUSCH, and uplink control signals that are transmitted in the PUCCH and/or the PUSCH. As would be understood by a person skilled in the art, the control section 301 may be any type of device capable of performing the control functions, for example, a processor, a controller, a control circuit, or a control device.

The transmission signal generating section 302 generates DL signals (downlink control signals, downlink data signals, downlink reference signals and so on) based on commands from the control section 301, and outputs these signals to the mapping section 303. To be more specific, the transmission signal generating section 302 generates a downlink data signal (PDSCH) including user data, and outputs it to the mapping section 303. Further, the transmission signal generating section 302 generates a downlink control signal (PDCCH/EPDCCH) including DCI (UL grant), and outputs it to the mapping section 303. Further, the transmission signal generating section 302 generates downlink reference signals such as CRS and CSI-RS, and outputs them to the mapping section 303. As would be understood by a person skilled in the art, the transmission signal generating section 302 may be any type of device capable of performing the signal generating functions, for example, a processor, a signal generator, a signal generating circuit, or a signal generating device.

The mapping section 303 maps the downlink signals generated in the transmission signal generating section 302 to predetermined radio resources based on commands from the control section 301, and outputs these to the transmitting/receiving sections 103. As would be understood by a person skilled in the art, the mapping section 303 may be any type of device capable of performing the resource mapping functions, for example, a processor, mapper, a mapping circuit or a mapping device.

The received signal processing section 304 performs the reception process (for example, demapping, demodulation, decoding, etc.) of the UL signals (HARQ-ACK, PUSCH, etc.) transmitted from the user terminal 20. The processing results are output to the control section 301. As would be understood by a person skilled in the art, the receiving process section 304 may be any type of device capable of performing the signal processing functions, for example, a signal processor, a signal processing circuit or a signal processing device, and a measurer, a measurement circuit or a measurement device.

The measurement section 305 conducts measurements with respect to the received signals. Also, by using the received signals, the measurement section 305 can measure the received power (for example, Reference Signal Received Power (RSRP)), the received quality (for example, Reference Signal Received Quality (RSRQ)), channel states (CSI) and so on. The measurement results may be output to the control section 301. As would be understood by a person skilled in the art, the measurement section 305 may be any type of device capable of performing the measurement functions, for example, a processor, a measurer, a measurement circuit, or a measurement device.

<User Terminal>

Figure 12:
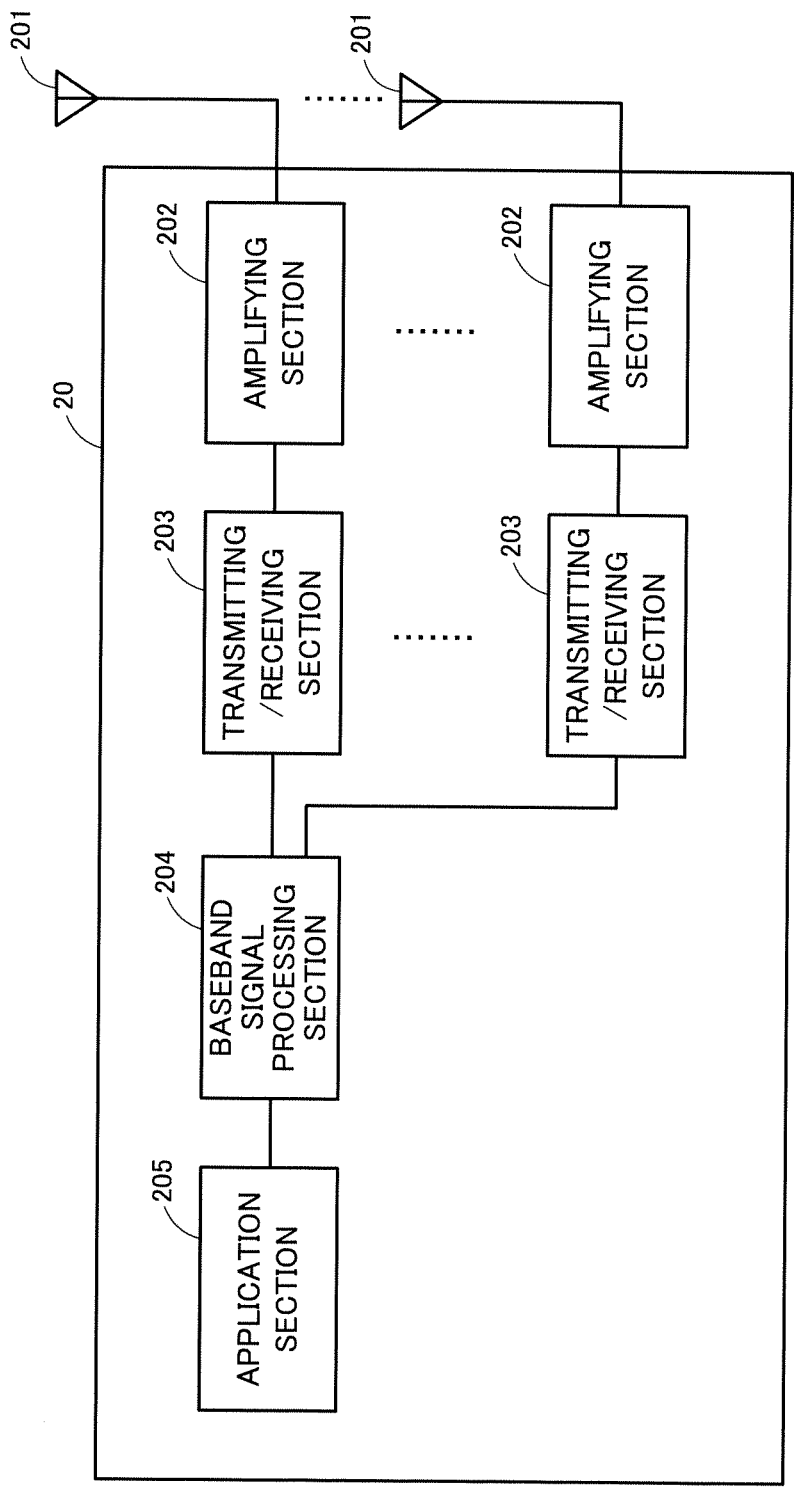
FIG. 12 is a diagram to show an example of a functional structure of a user terminal in accordance with embodiments of the present invention.

FIG. 12 is a diagram to show an example of an overall structure of a user terminal according to embodiments of the present invention. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving sections 203, and output to the baseband signal processing section 204.

The transmitting/receiving section (receiving section) 203 receives a deactivation command commanding to deactivate the specific cell (PUCCH SCell). Further, in the cell group (PUCCH group) in which a plurality of cells are configured, the transmission/receiving section (transmission section) 203 transmits the uplink control information (for example, CSI, HARQ-ACK for deactivation command, etc.) using the uplink control channel of the specific cell. As would be understood by a person skilled in the art, the transmitting/receiving sections 203 may be any type of device capable of performing the transmission and reception functions, for example, transmitters/receivers, transmitting/receiving circuits or transmitting/receiving devices.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 13:
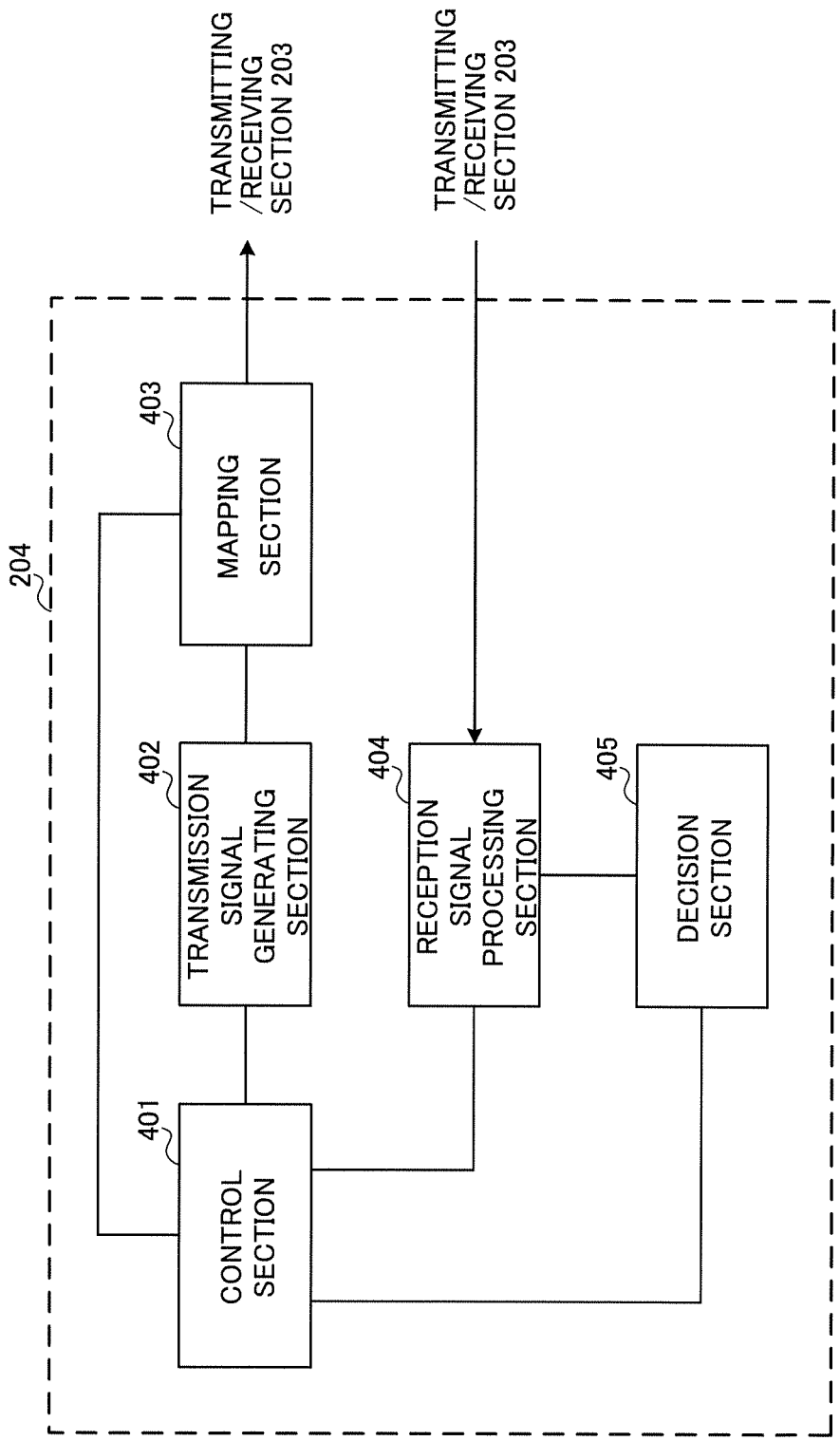
FIG. 13 is a diagram to show an example of a functional structure of a user terminal in accordance with embodiments of the present invention.

FIG. 13 is a diagram to show an example of a functional structure of a user terminal according to the present embodiment. Note that, although FIG. 13 primarily shows functional blocks that pertain to characteristic parts of the present embodiment, the user terminal 20 has other functional blocks that are necessary for radio communication as well. As shown in FIG. 13, the baseband signal processing section 204 provided in the user terminal 20 has a control section 401, a transmission signal generating section 402, a mapping section 403, a received signal processing section 404 and a decision section 405.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on. To be more specific, the control section 401 can control the transmission signal generating section 402, the mapping section 403 and the received signal processing section 404.

The control section 401 controls the deactivation operation (deactivation) of the cells included in the cell group (PUCCH group) based on deactivation commands for the cell and/or on the expiration of a deactivation timer. For example, the control section 401 can deactivate a specific cell within a predetermined period from a subframe in which a deactivation command for a specific cell is reported and/or a subframe at which the deactivation timer has expired.

Further, the control section 401 can perform control so that the channel state information reporting of the cells included in the cell group is stopped at the same time as or prior to the timing to deactivate the specific cell. Further, after stopping the specific cell, the control section 401 performs control such that the report of the channel state information of the cells included in the cell group is transmitted using the cells of other cell groups different from the cell group.

Further, the control section 401 can control the deactivation operation of the specific cell based on the assumption that the deactivation command for the specific cell is not transmitted in the cell of the cell group including the specific cell. Further, based on the timing to deactivate a specific cell, the control section 401 can determine whether or not to transmit HARQ-ACK to a deactivation command for a specific cell. Further, when a deactivation command for a specific cell is received in a certain subframe, in a subframe after the timing at which the HARQ-ACK in response to the deactivation command is fed back, the control section 401 can deactivate a specific cell.

Further, when the deactivation command for a specific cell is reported in a subframe and/or the deactivation timer expires, the control section 401 can stop the specific cell in a subframe a predetermined period of time later. Further, the control section 401 can control the deactivation timing of a specific cell in consideration of the timing advance timer of a specific cell. As would be understood by a person skilled in the art, the control section 401 may be any type of device capable of performing the control functions, for example, a processor, a controller, a control circuit or a control device.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs), channel state information (CSI) and so on, based on commands from the control section 401.

Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal. As would be understood by a person skilled in the art, the transmission signal generating section 402 may be any type of device capable of performing the signal generating functions, for example, a signal generator, a signal generating circuit or a signal generating device.

The mapping section 403 maps the uplink signals (uplink control signals and/or uplink data) generated in the transmission signal generating section 402 to radio resources based on commands from the control section 401, and output the result to the transmitting/receiving sections 203. As would be understood by a person skilled in the art, the mapping section 403 may be any type of device capable of performing the resource mapping functions, for example, a processor, mapper, a mapping circuit or a mapping device.

The received signal processing section 404 performs receiving processes (for example, demapping, demodulation, decoding and so on) of DL signals (for example, downlink control signals transmitted from the radio base station, downlink data signals transmitted in the PDSCH, and so on). The received signal processing section 404 outputs the information received from the radio base station 10, to the control section 401. The received signal processing section 404 outputs, for example, broadcast information, system information, RRC signaling, DCI and so on, to the control section 401.

As would be understood by a person skilled in the art, the received signal processing section 404 may be any type of device capable of performing the signal processing functions, for example, a signal processor, a signal processing circuit or a signal processing device, and a measurer, a measurement circuit, or a measurement device. As would be understood by a person skilled in the art, the received signal processing section 404 may be any type of device capable of performing the signal reception functions, for example, a receiver, the receiving section according to embodiments of the present invention.

The decision section 405 makes retransmission control decisions (ACKs/NACKs) based on the decoding results in the receiving process section 404, and, furthermore, outputs the results to the control section 401. When downlink signals (PDSCH) are transmitted from multiple CCs (for example, six or more CCs), retransmission control decisions (ACKs/NACKs) are made on a per CC basis, and output to the control section 401. As would be understood by a person skilled in the art, the decision section 405 may be any type of device capable of performing the control functions, for example, a processor, a decision maker, a decision making circuit, or a decision making device.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an Application-Specific Integrated Circuit (ASIC), a Programmable Logic Device (PLD), a Field Programmable Gate Array (FPGA) and so on. Also, the radio base stations 10 and user terminals 20 may be implemented with a computer device that includes a processor (Central Processing Unit (CPU)), a communication interface for connecting with networks, a memory and a computer-readable storage medium that holds programs. That is, the radio base stations and user terminals according to embodiments of the present invention may function as computers that execute the processes of the radio communication method in accordance with embodiments of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "carrier frequencies," "cells" and so on.

Also, the information and parameters described in this description may be represented in absolute values or in relative values with respect to a predetermined value, or may be represented in other information formats. For example, radio resources may be specified by indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The examples/embodiments illustrated in this description may be used individually or in combinations, and may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, Downlink Control Information (DCI) and Uplink Control Information (UCI)), higher layer signaling (for example, Radio Resource Control (RRC) signaling, Medium Access Control (MAC) signaling, and broadcast information (the Master Information Block (MIB) and System Information Blocks (SIBs))), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A user terminal comprising:
   a transmitter that:
      communicates with a cell group (CG) including a first secondary cell (Scell) and a second Scell; and
      transmits uplink control information using an uplink control channel of the first Scell; and
   a processor that deactivates the second Scell when a deactivation command for the second Scell is reported or a deactivation timer applied to the second Scell expires,
   wherein, the processor deactivates the second Scell when the deactivation command for the first Scell is reported or the deactivation timer applied to the first Scell expires, and
   when the deactivation command for the second Scell is reported or the deactivation timer applied to the second Scell expires, if a cell that transmits an uplink control channel in a CG including the second Scell is in an active state in a period after a predetermined period, then the processor causes the transmitter to perform channel state information (CSI) reporting of the second Scell.

2. The user terminal according to claim 1,
   wherein the processor does not cause the transmitter to perform CSI reporting in the second Scell at or before a time when the first Scell is deactivated.

3. The user terminal according to claim 1,
   wherein the transmitter communicates with a second CG including a primary cell (Pcell) and a third Scell,
   wherein the transmitter transmits an uplink control channel using the Pcell, and
   wherein, when the deactivation command for the third Scell is reported or the deactivation timer applied to the third Scell expires, the processor causes the transmitter to perform CSI reporting of the third Scell in a predetermined period regardless of the timing of the third Scell being deactivated.

4. The user terminal according to claim 1, wherein the processor deactivates the first Scell within a predetermined period from a period in which a deactivation command for the first Scell is reported or a period in which a deactivation timer for the first Scell expires.

5. A radio base station comprising:
a receiver that:
communicates with a user terminal connected with a cell group (CG) including a first secondary cell (Scell) and a second Scell; and
receives uplink control information transmitted from the user terminal in an uplink control channel of the first Scell; and
a transmitter that transmits a deactivation command for the first Scell to the user terminal,
wherein, when the deactivation command for the first Scell is transmitted, the user terminal deactivates the second Scell, and
when the deactivation command for the second Scell is transmitted, if a cell that transmits an uplink control channel in a CG including the second Scell is in an active state in a period after a predetermined period, then the user terminal performs channel state information (CSI) reporting of the second Scell.

6. A radio communication method for a user terminal, the method comprising:
transmitting uplink control information using an uplink control channel of a first secondary cell (Scell) and a second Scell in a cell group (CG);
deactivating the second Scell when a deactivation command for the second Scell is reported or a deactivation timer applied to the second Scell expires;
deactivating the second Scell when the deactivation command for the first Scell is reported or the deactivation timer applied to the first Scell expires; and
when the deactivation command for the second Scell is reported or the deactivation timer applied to the second Scell expires, if a cell that transmits an uplink control channel in a CG including the second Scell is in an active state in a period after a predetermined period, causing the transmitter to perform channel state information (CSI) reporting of the second Scell.

* * * * *